United States Patent [19] [11] 4,317,649
Boellmann [45] Mar. 2, 1982

[54] PELLET MOLDING APPARATUS

[75] Inventor: Horst E. Boellmann, Delran, N.J.
[73] Assignee: Per-Fil Industries, Burlington, N.J.

[21] Appl. No.: 148,918
[22] Filed: May 12, 1980
[51] Int. Cl.³ .............. A01J 21/00
[52] U.S. Cl. .............. 425/150; 425/167; 425/261
[58] Field of Search .............. 425/261, 150, 167

[56] References Cited

U.S. PATENT DOCUMENTS

| | | | |
|---|---|---|---|
| 3,825,386 | 6/1974 | Bello et al. | 425/150 |
| 3,891,375 | 6/1975 | Pilewski et al. | 425/261 |
| 3,957,408 | 5/1976 | Clymer et al. | 425/261 |
| 4,030,868 | 6/1977 | Williams | 425/261 |

*Primary Examiner*—James R. Hall
*Attorney, Agent, or Firm*—Duffield & Lehrer

[57] ABSTRACT

Pellet molding apparatus for molding pellets from a powder material which includes a rotary index table upon which are placed a plurality of hollow cylindrical mold members spaced at equal radial and arc distances one from another. A mold filling station assembly is provided to fill the molds and a vertically operating hydraulic press at a pressing station compresses the powder in the cylindrical molds into pellets. A pivoted mold bottom operates upon a cam surface to maintain the bottom ends of the molds closed through the filling and pressing stations and swings open at an ejection station. An ejection station is provided and includes rams operating through the top of the mold member to force the compressed pellet out of the mold member through the open bottom end of the mold member.

13 Claims, 8 Drawing Figures

PELLET MOLDING APPARATUS

BACKGROUND OF INVENTION

The present invention applies to pellet molding apparatus and particularly to the type of pellet molding apparatus capable of molding log fire starting pellets composed of a material which must be molded under controlled time and pressure and in a particular manner to permit ejection of the pellet from the mold members.

There is currently in existence a number of different types of pellet or capsule molding machines which are used to form pellets from different materials such as chlorine for swimming pools, the commonly known aspirin tablet and other types of tablets. In one form of these type of machines, a die is used into which there is placed a measured quantity of material to be compressed and the compression occurs by means of a fixed displacement ram operated by a cam or other positive displacement mechanism. In these machines, the pressure applied to the material being compressed will vary if the quantity of material placed into the ram is slightly above or below the exact amount required. Machines of this nature can operate under high speed and are suitable for pelletizing material of a nature in which the pressure applied is not critical.

Another form of machine used to create large pellets such as the chlorine pellets or tablets operates upon the principle of impacting the material placed within a ram and punch. This machine operates much on the common known principle of the punch press and impacts the material by means of the kinetic energy of a flywheel or other impact member. Again, these machines operate at a relatively high speed but the material upon which they are operating must be of the type that can be compressed quickly and which is not sensitive to fluctuation in pressures.

A third general category of tablet or pellet forming machine utilizes pneumatics as the pressure applying medium operating against a ram in conjunction with a die into which a metered amount of the material to be compressed has been placed. Again, these machines operate on a relatively high speed. However, the characteristic of pneumatic pressure, while capable of generating large pressures often necessary in forming some pellets, is not capable of applying a uniform pressure over a predetermined distance with a controlled rate of descent of the ram member.

The foregoing described machines for making pellets or tablets will not work effectively on all types of material which may be desired to be formed into pellets. One example of such a material is that used to form igneous slow burning pellets used to start wood fires in fireplaces. This material is formed of a composition of, primarily, sawdust and paraffin together with other organic materials. One example of the ingredients of such a material is that set forth in U.S. Pat. No. 3,988,121.

Forming pellets from the sawdust-paraffin composition material presents several problems. One great problem is that the composition of the paraffin in conjunction with the sawdust, in order to be formed into a stable pellet, must be subjected to a uniform controlled pressure over a finite period of time sufficient to permit the paraffin to flow and reform in the configuration of the pellet. Too rapid or uneven application of pressure to the sawdust-paraffin composition results in fractured pellets and/or uneven density and disintegrating pellets.

Another problem encountered with the sawdust-paraffin composition in the process of pelletizing the material is that the composition, after compression, exhibits significant adhesion to the walls of the die requiring undue pressure to remove the material upwardly from the die in the direction opposite to which it was compressed. The forces required for removal often results in fracture and destruction of the pellet.

OBJECTS AND SUMMARY OF INVENTION

It is the object of the present invention to provide apparatus for molding of pellets and the like which is capable of operating and forming sound pellets of material which requires the controlled application of pressure over a finite time to form the pellet and which also resists removal from the ram assembly following formation of the pellet.

The foregoing object is carried out by the present invention through the utilization of a rotary index table upon which there are positioned a plurality of mold clusters having four mold members in each cluster. The clusters are spaced equal radial distances upon the rotary index table and likewise spaced equal arc distances one from another. Each mold member is hollow and open at its top and bottom ends.

A pivoted mold bottom is provided for each cluster and is pivoted upon the bottom portion of the rotary index table. The pivoted mold bottom operates in conjunction with a cam assembly which will pivot the mold bottom between a closed position in engagement with the bottom ends of the mold members and an open position swung completely out of engagement and interference with the mold members.

Two mold filling station assemblies are provided positioned beside one another around the outer circumference of the rotary index table. The mold filling station assemblies are aligned or sequentially index with the top ends of the mold members of a cluster and operate in conjunction with metered dispensers to dispense to each of the four mold members of a mold cluster a predetermined amount of the material to be formed into a pellet. The pivoted mold bottom is in closed position at the mold filling station.

A pressing station assembly is provided which is positioned above the rotary index table and which sequentially indexes with the mold clusters. The pressing station assembly includes four mold rams which correspond with the four mold members and which operate downwardly through the top end of the mold members to compress the powdered material within the mold members and against the mold bottom which is in its closed position. The pressing station assembly is operated by means of a hydraulic press which includes a controlled rate of descent and pressure applied to the material to compress the powdered material at a uniform rate over a predetermined time.

An ejection station assembly is provided which likewise includes four ejection rams which index sequentially with the four mold members of a cluster following the pressing of the material within the mold members. The ejection rams operate in a vertical direction downwardly through the mold members to eject the pellet from the bottom ends of the mold members. The mold bottom is pivoted to its open position at this station.

The cam means which operates in conjunction with the pivoted mold bottom operates to bring the mold bottom into a closed position slightly in advance of a given mold cluster reaching the first mold filling station. The pivoted mold bottom is maintained closed until the given cluster has passed beyond the pressing station assembly. Thereafter, the cam permits the pivoted mold bottom to swing downwardly below the mold cluster out of axial alignment with the mold members.

The bottom portion of the mold members are tapered in a direction of increasing diameter toward the bottom end of the mold member. The ejection ram, upon the particular mold cluster being indexed to the ejection ram, operates to push the pellets downwardly through the mold members and out the bottom end of the mold members. The taper in the lower portion of the mold members aids in the easy ejection of the pellet.

An index drive is provided to periodically index the rotary index table a predetermined arc distance equal to the arc distance between the mold clusters to thus sequentially index the mold cluster to the filling stations, pressing station and ejection station.

Index drive control means are provided which sense the position of the rams in the pressing station assembly and ejection station assembly and operate to inhibit operation of the index drive means until the rams are completely retracted from the mold members.

An overload clutch is provided between the index drive means and the rotary index table. Clutch actuation sensing means are also provided which sense the actuation of the clutch in an overload condition and inhibit the index drive means during overload conditions.

Other objects and advantages of the present invention will become apparent to those skilled in the art from the detailed description thereof which follows taken in conjunction with the drawings.

DETAILED DESCRIPTION OF INVENTION

Figure 1:
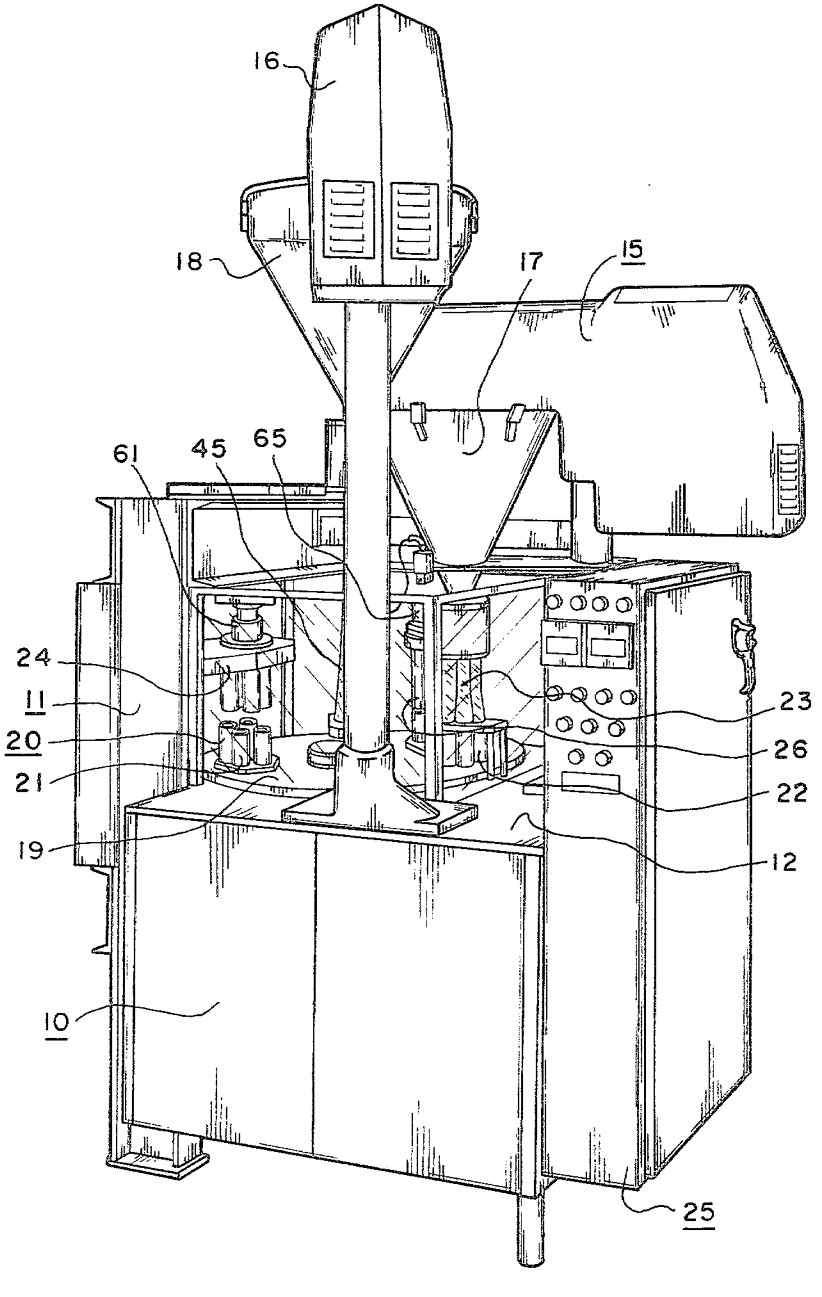
FIG. 1 is a perspective view of the pellet molding apparatus of the present invention.

The pellet molding apparatus of the present invention is shown generally in FIG. 1. The apparatus includes the major components of a base cabinet 10 and an I-beam press structure 11 interconnected with the base cabinet 10. The upper portion of the base cabinet 10 includes a stationary table surface 12 upon which there are mounted two auger type fillers 15 and 16. The auger fillers 15 and 16 each include material hoppers 17 and 18 into which the material to be compressed into pellets is placed. The auger fillers may be of the type manufactured by Per-Fil Industries, Burlington, N.J., known as their model No. PF14.

Positioned level with and within the stationary table surface 12 is a rotary index table 19. As will be discussed in more detail hereinafter, the rotary index table 19 includes a plurality of mold clusters 20 spaced on equal radial distances from the center of the rotary table and equal arc distances one from another. Each mold cluster 20 includes four mold members 21.

Figure 2:
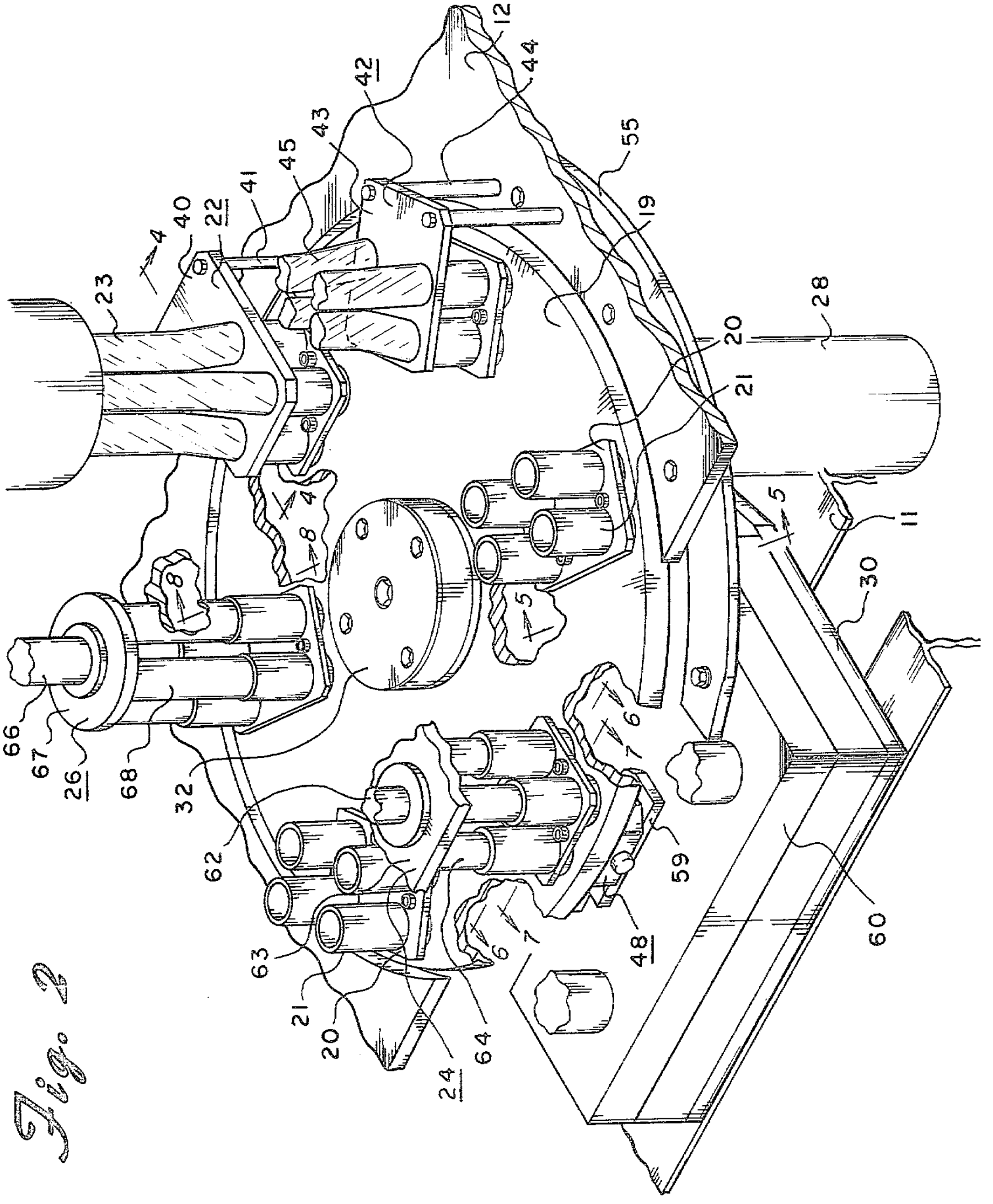
FIG. 2 is a perspective view, partially in section, of the rotary index table and associated apparatus of the present invention.

The molding apparatus includes a first mold filling station assembly 22 and a second mold filling station assembly 42, the latter which may not be seen in FIG. 1 but can be seen in FIG. 2.

The material being dispensed to the first and second mold filling assemblies, as will be described in more detail hereinafter, is fed to these assemblies by means of four feed tubes 23 and 45 respectively leading from the hoppers 17 and 18 of the auger fillers.

A pressing station assembly 24 is positioned above the mold clusters 20 and is interconnected into the I-beam structure 11 as will likewise be described further hereinafter.

An ejection station assembly 26 is provided, a portion of which may be seen in FIG. 1. The details and operation of the ejection station assembly will be described in more detail hereinafter.

The pellet molding apparatus of the present invention also includes as an overall component thereof an electronic control cabinet 25 which is carried by the base cabinet 10. The control cabinet 25 includes the electronics and other control circuitry for operation of the rotary index table and the various hydraulic structures as will likewise be described hereinafter.

Figure 3:
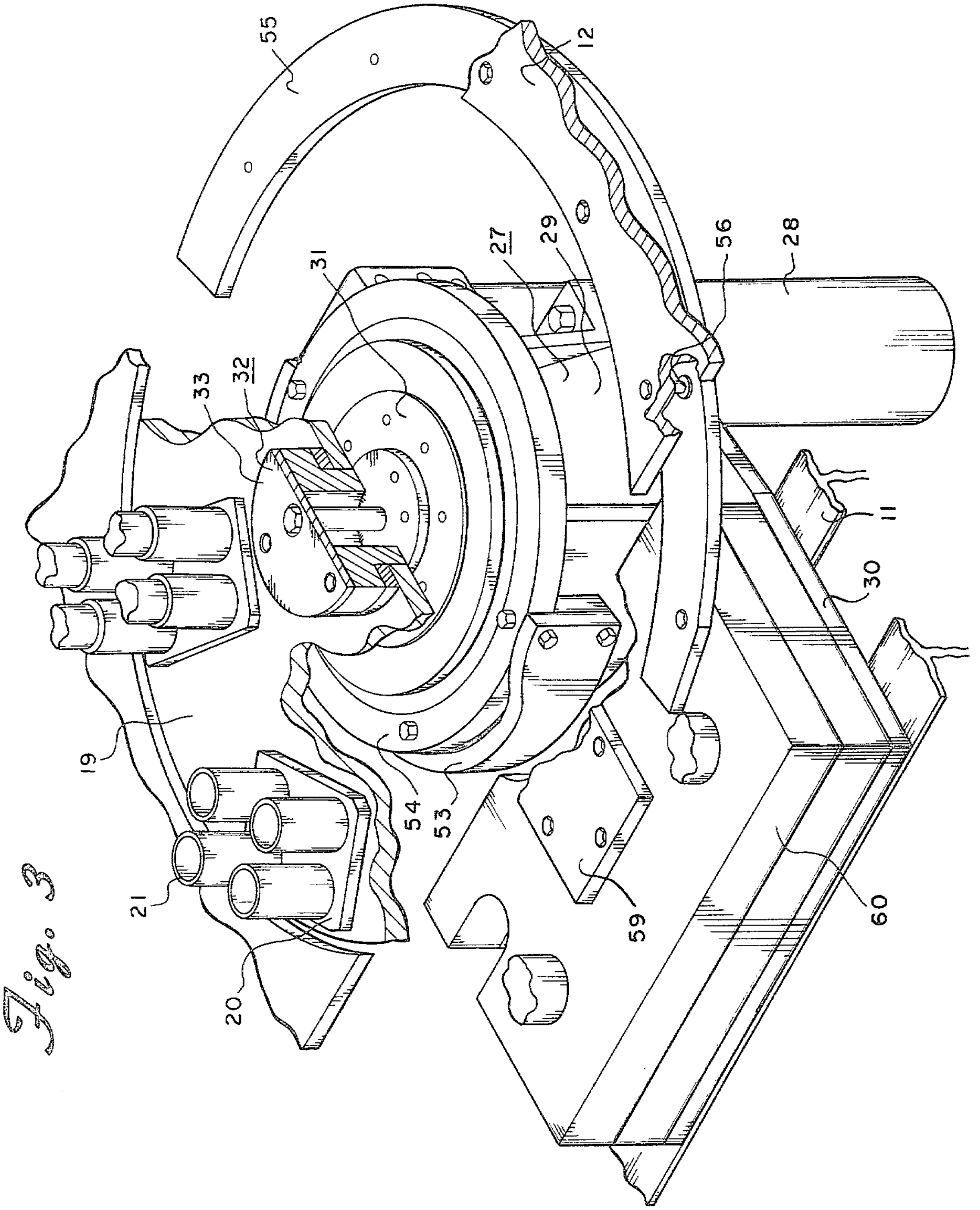
FIG. 3 is a perspective view, partially in section, showing the index drive means and inner and outer cam of the pellet molding apparatus of the present invention.

The details of the pellet molding apparatus of the present invention including the rotary index table and associated equipment are shown in FIGS. 2 and 3 of the drawings to which reference is now being made. Referring primarily to FIG. 3, an index drive assembly 27 is provided. The index drive assembly includes a drive motor 28 which drives an indexing mechanism within the index assembly housing 29. The index housing assembly 29 is carried in place and bolted to a support plate 30 which is likewise secured to the I-beam assembly 11.

The index drive assembly 27 includes an output drive plate 31 projecting slightly above the upper portion of the index drive assembly housing 29. The rotary index table 19 is interconnected to the output drive plate 31 and supported thereon by means of an overload clutch 32. The relative elevations of the output drive plate 31 and rotary index table 19, when in position upon the output drive plate 31, is such that the upper surface of the rotary index table 19 will be flush with the upper surface of the stationary table surface 12.

The rotary index drive assembly 27 is preferably of the cam operated type manufactured by the Commercial Cam Division of Emmerson Electric Company. A rotary index assembly of this type operates to sequentially, upon command, rotate through a precise predetermined number of degrees and stop and lock in place until the next indexing signal is received by the rotary index assembly. In the present case, the indexing arc is 60°.

The overload clutch 32 utilized in the apparatus for molding pellets of the present invention may also be of the type manufactured by the Commercial Cam Division of Emmerson Electric Company. A clutch of this type is one which utilizes spring loaded dow pins interconnecting the output drive plate 31 of the rotary index assembly 27 with the rotary index table 19. Upon the appearance of an overload condition, the dow pins will ride upwardly out of their recesses causing the upper control plate 33 of the clutch mechanism 32 to be elevated, thus disengaging the clutch and also raising a control rod 34. A microswitch (not shown) is in contact with the lower portion of the control rod 34 and will sense the disengagement of the clutch. The microswitch is interconnected through the control circuitry to discontinue operation of the rotary index assembly 27.

Referring now primarily to FIG. 2, the upper portion of the rotary index table and its associated apparatus is shown. Mounted upon the upper surface of the rotary index table are six sets of mold clusters 20. Each mold cluster includes four cylindrical open ended mold members 21. As may be seen in detail in FIG. 7, the lower portion of each mold member 21 extends through an aperture 35 in the rotary index plate 19 and a small portion of the open bottom end of the mold member 21 projects beneath the under surface of the rotary index table 19. The mold members are held in place by means of a hold-down plate 36 which secures the mold member 21 downwardly against a shoulder 37 on the mold member.

The bottom portion of the mold members include a slight taper of increasing diameter toward the bottom of the mold member. This taper aids in the release of the compressed pellet at the ejection station.

Returning to FIG. 2, the pellet molding apparatus of the present invention includes a first mold filling station 22. The first mold filling station 22 includes a distribution plate 40 secured upon standoffs 41 slightly above the upper end of the mold member 21. Four material feed tubes 23 are secured into the distribution plate 40. When the rotary index table is properly indexed with a mold cluster beneath the distribution plate 40, the auger fillers are operated and a precise needed amount of material is fed through the feed tubes 23 and distribution plate 40 to the mold members 21.

In a like manner and like operation, there is provided a second mold filling station 42. The second mold filling station 42 includes a distribution plate 43 which is secured upon standoffs 44 slightly above the upper end of the mold members 21. Likewise, four material feed tubes 45 are secured into the distribution plate 43 and provide the conduit from the auger filler hopper 18 of the second auger filler 16 as shown in FIG. 1. The arcuate spacing of the second mold filling station assembly with respect to the first mold filling station assembly is such that there will be simultaneous registry of the mold clusters at each filling station assembly as the rotary index table is indexed sequentially through its 60° arcuate indexing cycle.

Each mold cluster 20 operates in conjunction with a pivoted mold bottom 48. As may be best seen in FIG. 8, the pivoted mold bottom 48 is pivoted upon an axle 49 passing through two lugs 50 upon the bottom surface of the rotary index plate 19 and also through leading edge 51 of the pivoted mold bottom 48. The mold bottom 48 further includes two cam followers 52 positioned midway along the mold bottom.

Figure 7:
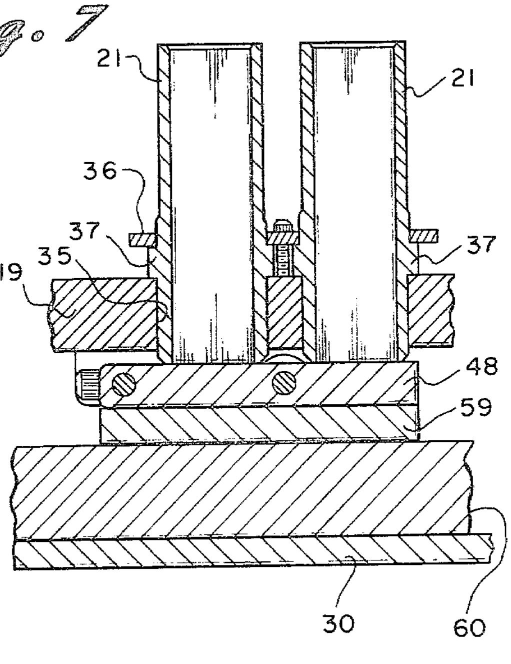
FIG. 7 is an elevational view in section taken along the lines 7—7 in FIG. 2 showing the cross sectional configuration of the mold members.
Figure 8:
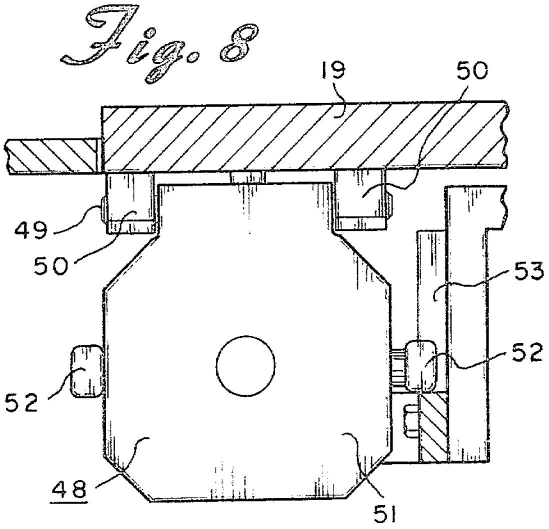
FIG. 8 is an elevational view in section taken along the lines 8—8 in FIG. 2 showing the relationship of the pivoted mold bottom in respect to the rotary index table and inner cam at the ejection station assembly.

The pivoted mold bottom is designed to pivot between a closed position in engagement with the bottom ends of the mold members 21 as shown, for example, in FIG. 7 to an open position out of engagement with the bottom ends of the mold members 21 as shown in FIG. 8. The pivoting action of the mold bottom 48 between its open and closed positions is controlled by means of an inner and outer cam as will be described immediately following.

As may best be seen in FIG. 3, an inner cam 53 is provided. The inner cam is secured to a flange 54 of the rotary index assembly housing 29. The inner cam extends from a position slightly in advance of the pressing station assembly 24 beneath the rotary index table 19 in an arcuate path around past the first mold filling assembly 22. The contour of the inner cam 53 will be described hereinafter in respect to FIGS. 4 and 8 of the drawings.

The pellet molding apparatus of the present invention further includes an outer cam 55 as may be seen in FIG. 3. The outer cam is likewise disposed beneath the rotary index table 19 and is supported upon standoffs 56 secured into the stationary table surface 12. The outer cam 55 extends in an arcuate direction from slightly before the first mold filling station assembly 22 in an arcuate direction toward the second mold filling station assembly to a position slightly in advance of the pressing station assembly 24. The contour of cam 55 is essentially flat.

Figure 4:
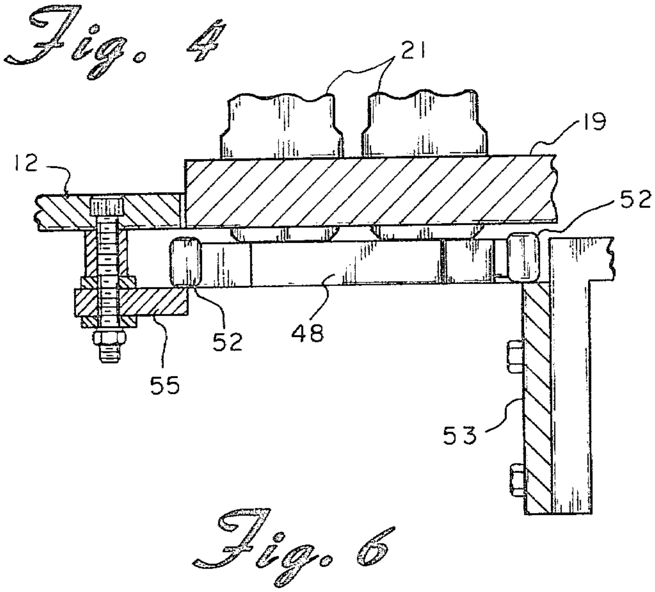
FIG. 4 is an elevational view in section taken along the lines 4—4 of FIG. 2 showing the relationship of the mold members, pivoted mold bottom and inner and outer cam at the first mold filling station assembly.
Figure 5:
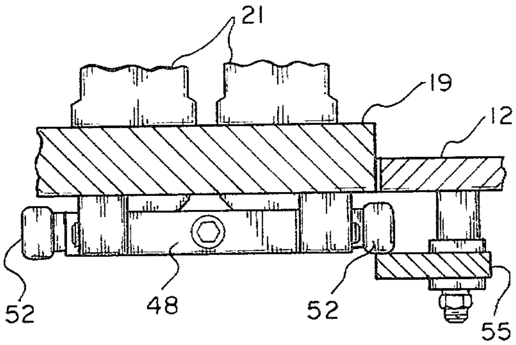
FIG. 5 is an elevational view in section taken along the lines 5—5 of FIG. 2 showing the relationship of the mold members, rotary index table, pivoted mold bottom and outer cam intermediate the second filling station and the pressing station assembly.

The cooperation of the inner and outer cams with the cam followers 52 of the pivoted mold bottom 48 is shown in sequence in FIGS. 4 through 8. FIG. 4 shows the position of the pivoted mold bottom 48 with respect to the inner and outer cams 55 and 53 respectively when the mold cluster 20 is at the first mold filling station 22. At this position the cam rollers 52 are positioned upon both the inner and outer cam and the mold bottom is held in closed position.

As the rotary index table indexes the mold cluster to the second mold filling assembly, the inner cam 55 terminates just past the first mold filling assembly and the cam follower 52 continues to ride upon the upper surface of the outer cam 55 to maintain the mold bottom closed. This condition continues through a position just in advance of the pressing station assembly 24 as may be seen in FIG. 5 which is a section taken in advance of the pressing station assembly.

As the mold cluster is indexed toward the pressing station assembly 24, the cam follower 52 associated with the inner cam 53 will engage the leading edge of the inner cam 53. Shortly thereafter, the cam follower 52 associated with the outer cam 55 will become disengaged from the outer cam 55.

Figure 6:
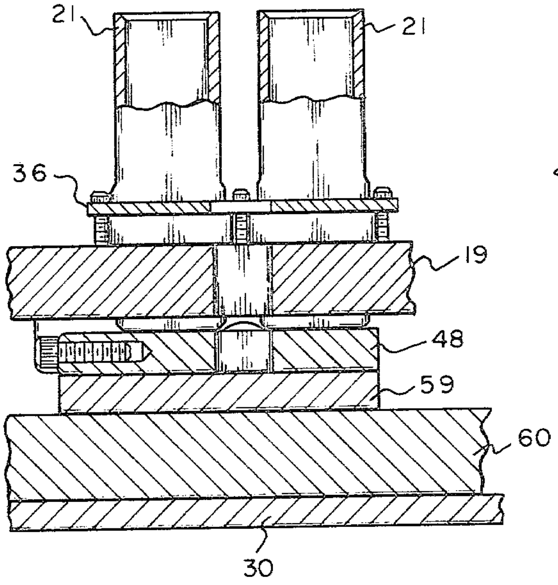
FIG. 6 is an elevational view in section taken along the lines 6—6 of FIG. 2 showing the relationship of the mold members and pivoted mold bottom with the press bed plate at the pressing station assembly.

As the mold cluster approaches the mold pressing station assembly 24, the bottom surface of the mold bottom 48 comes into a slight interference engagement or contact with a mold bottom backup plate 59 as shown in FIG. 6. The mold bottom backup plate 59 is positioned upon a press bed plate 60 which is likewise positioned upon the support plate 30 carried upon the I-beam structure 11. The mold bottom backup plate 59 and press bed plate 60 provide the reinforcement and backup for the mold bottom during the pressing cycle and thus relieve any undue pressures upon the mold bottom and cam surfaces.

As the mold cluster is indexed from the pressing station assembly 24, the contour of the inner cam 53 begins to drop downwardly. As the mold cluster is indexed toward the ejection station 26, the slope of the inner cam 53 continues to decline to a depth at the ejection station, as best seen in FIG. 8, at which the mold bottom 48 is permitted to swing downwardly below the rotary index table to a substantially perpendicular position. In this position, the pivoted mold bottom is completely open and out of any interference with the bottom ends of the mold members 21.

As may be seen in FIG. 8, the contour of the inner cam 53 begins an incline in the direction of the first mold filling assembly 22. As the mold cluster is further indexed toward the first mold filling assembly 22, the mold bottom 48 will be brought into a closed position and the cam roller 52 associated with the outer cam 55 will engage the leading end of the outer cam 55 until the condition as shown in FIG. 4 is reached at the first mold filling station assembly.

The details of the mold pressing station assembly 24 of the present invention are shown in FIG. 2. The pressing station assembly 24 includes a hydraulic cylinder 61 (shown in FIG. 1) which operates through a piston rod 62 and bears upon a compression plate 63. Four molding rams 64 are secured to the compression plate 63 and are positioned for vertical travel downwardly through the top ends of the mold members 21.

The details of the ejection station assembly 26 are shown in FIG. 2. The ejection station assembly includes a hydraulic cylinder 65 (shown in FIG. 1) which operates through a piston rod 66 to bear upon a second compression plate 67. Four ejection rams 68 are secured to the compression plate 67 and align with the four mold members 21. The four rams 68 are designed to pass through the upper portion of the mold members 21 and force the compressed pellets out of the mold members through the bottom end into a suitable hopper or other device for collecting the finished pellets.

In a typical operation for manufacturing pellets for use as ignitors for fire logs, powdered ignitor material is placed in the first hopper 17 of the auger filler 15. A second basic burning material composed of sawdust and paraffin is placed in the hopper 18 of the second auger filler 16. During an operating sequence, the rotary index table rotates to bring into registry a set of mold clusters at each of the first and second mold filling stations, the pressing station assembly and the ejection station assembly. Thereafter, the first mold filling station assembly and the second mold filling station assembly are actuated to deposit a predetermined amount of the material into the mold members. Of course, the mold members at the second mold filling station will have already been filled with a predetermined amount of powder at the first mold filling station in the preceding cycle. In a preferred embodiment, 7–14 grams of the ignitor material are filled into the mold members at the first mold filling station assembly whereas 90–100 grams of material are loaded into the mold members at the second mold filling station assembly.

Simultaneously with the filling of the mold members, the pressing station assembly is actuated upon the material filled into the mold members from prior cycles. In the example being discussed, the hydraulic cylinder associated with the pressing station assembly applies a controlled downward displacement in the range of 2,500 to 3,000 pounds per square inch upon the material in the mold members and continues the press cycle for approximately 6 seconds. The duration of the press cycle provides time for the paraffin within the mold to properly flow which, combined with the proper steady application of the pressure described above, will provide a solid homogeneous pellet with good integrity.

The hydraulic control system for the pressing station assembly is valved such that the return of the molding rams is accomplished within two seconds.

Simultaneously with the operation of the filling and compressing processes, the ejection station assembly is also actuated. The height of the finished pellet within the mold members will be just at the top of the tapered portion of the mold members. As the ejection rams come into contact with the pellets, not too great of pressure is required to break the pellet away into the tapered portion thus permitting the pellets to be pushed completely from the mold members by the ejection rams which pass substantially to the bottom portion of the mold members. At this time, the pivoted mold bottom has swung completely out of the way permitting ejection of the pellets. The hydraulic press operating the ejection ram requires 1 second to effect ejection of the pellets and 1½ seconds to return to its retracted position.

Electric sensors are utilized on both the pressing station assembly and ejection station assembly to sense when the molding rams and ejection rams have become completely retracted. When this occurs, a signal is applied to the controller which then operates the index drive assembly to index the rotary index table one cycle. In the example being discussed, this index time is two seconds.

From the foregoing, it is to be appreciated that the pellet molding apparatus of the present invention provides a simple, efficient and effective molding apparatus for molding material of the type to which a predetermined pressure and time must be applied to effect a sound molding. This is accomplished by means of the foregoing invention by the application of a controlled hydraulic pressure to the material which operates by the application of the pressure over a predetermined time. Additionally, material of the type having an affinity to adhere to the mold walls may be accommodated in the present invention by the utilization of ejection from the opposite end of the mold member and a taper in the bottom end of the mold member beginning at approximately the upper level of the pellet being pressed.

The pellet molding apparatus of the present invention has been described in respect to a particular embodiment thereof shown in the drawings. Other variations and modifications to the embodiment shown will thus become apparent to those skilled in the art by reason of the foregoing description and embodiment shown in the drawings. It is to be understood that no limitation was intended by the description of the present invention in respect to a particular embodiment thereof but the scope of the invention is to be determined by the appended claims.

What is claimed is:

1. Apparatus for molding pellets from powdered material comprising:

an index table;

a plurality of vertically disposed hollow mold assemblies open at their top and bottom ends positioned upon the index table in a predetermined array;

at least one mold filling station assembly adapted to dispense a metered amount of powder into a given mold assembly from the top of the mold assembly as the same is indexed with the filling station assembly;

a pressing station assembly adapted to compress the powder within a mold assembly into a pellet as the mold assembly is indexed with the pressing station assembly;

an ejection station assembly adapted to eject the pellet from the mold assembly downwardly through the bottom end as the same is indexed with the ejection station assembly;

mold closure means adapted to close the mold assembly bottom ends between the filling station and pressing station and open the bottom ends of the mold assemblies at the ejection station; and index drive means for driving the index table in predetermined increments to align the mold assemblies sequentially with the filling station assembly, pressing station assembly and ejection station assembly.

2. The pellet molding apparatus of claim 1 wherein the mold assemblies are so positioned on the index table and the filling station assembly, pressing station assembly and ejection station assembly so positioned in respect to the index table to provide simultaneous indexing with and operation of the filling, pressing and ejection station assemblies with the mold assemblies.

3. The pellet molding apparatus of claim 2 wherein the index table is circular and the mold assemblies are positioned upon the index table at a common radial distance and spaced one from another equal arc distances.

4. The pellet molding apparatus of claim 1 further wherein the mold closure means includes a pivoted mold bottom adapted to be pivoted between a closed position in engagement with the bottom end of the mold member and an open position out of engagement with the bottom end of the mold member.

5. The pellet molding apparatus of claim 4 further including cam means for pivoting the mold bottom into closed position through the pressing and filling station assemblies and open position at the ejection station assembly.

6. The pellet molding apparatus of claim 5 wherein the pressing station assembly and ejection station assembly include rams which operate vertically through the top ends of the mold members to press and eject the pellets respectively.

7. The pellet molding apparatus of claim 6 further including index drive control means for sensing the position of the rams of the pressing station assembly and ejection station assembly and inhibiting operation of the index drive means until the rams are completely retracted from the mold members.

8. The pellet molding apparatus of claim 3 further including overload clutch means between the index table and the index drive means.

9. The pellet molding apparatus of claim 8 further including clutch actuation sensing means for inhibiting operation of the index drive means upon actuation of the clutch means.

10. The pellet molding apparatus of claim 1 wherein the mold assemblies include a slight taper in the bottom portion thereof of increasing diameter in a direction toward the bottom end of the mold assemblies.

11. The pellet molding apparatus of either claims 10 or 1 wherein the pressing station assembly includes a hydraulic press having a controlled descent rate.

12. The pellet molding apparatus of claim 6 wherein the mold assemblies include a slight taper in the bottom portion thereof of increasing diameter in a direction toward the bottom end of the mold assemblies.

13. The pellet molding apparatus of either of claims 6 or 12 wherein the pressing station assembly includes a hydraulic press having a controlled descent rate.

* * * * *